(12) United States Patent
Dantlgraber (10) Patent No.: US 6,817,859 B2
(45) Date of Patent: Nov. 16, 2004

(54) DRIVE DEVICE FOR A MOVABLE PART, ESPECIALLY A MOLD CLOSURE DEVICE FOR AN INJECTION MOLDING MACHINE, AND METHOD FOR OPERATING SUCH A DRIVE DEVICE

(75) Inventor: Jörg Dantlgraber, Lohr (DE)

(73) Assignee: Bosch Rexroth AG, Lohr/Main (DE)

( * ) Notice: Subject to any disclaimer, the term of this patent is extended or adjusted under 35 U.S.C. 154(b) by 209 days.

(21) Appl. No.: 10/152,311

(22) Filed: May 20, 2002

(65) Prior Publication Data

US 2003/0029325 A1 Feb. 13, 2003

(30) Foreign Application Priority Data

| Jul. 2, 2001 | (DE) | ......................................... 101 32 008 |
| Jul. 5, 2001 | (DE) | ......................................... 101 32 740 |
| Jul. 7, 2001 | (DE) | ......................................... 101 33 187 |
| Jul. 20, 2001 | (DE) | ......................................... 101 35 577 |

(51) Int. Cl.[7] .............................................. B29C 45/67
(52) U.S. Cl. ................. 425/590; 264/328.1; 425/451.2; 91/415; 91/471; 91/519
(58) Field of Search ................................ 425/589, 590, 425/451.2; 264/328.1; 91/415, 471, 519

(56) References Cited

U.S. PATENT DOCUMENTS

| 4,105,385 | A | * | 8/1978 | Hehl ........................... 425/590 |
| 4,380,427 | A | * | 4/1983 | Hehl ........................... 425/590 |
| 4,846,664 | A | * | 7/1989 | Hehl ........................... 425/590 |
| 5,129,806 | A | * | 7/1992 | Hehl ........................... 425/590 |
| 5,336,462 | A | * | 8/1994 | Wohlrab .................. 264/328.1 |
| 5,750,163 | A | * | 5/1998 | Klein et al. ................. 425/590 |
| 5,773,050 | A | * | 6/1998 | Wohlrab ..................... 425/590 |

FOREIGN PATENT DOCUMENTS

DE           19523420           9/1996

* cited by examiner

Primary Examiner—James P. Mackey
(74) Attorney, Agent, or Firm—Martin A. Farber (57) ABSTRACT

A drive for a movable part, such as a mold closure platen, includes two hydraulic cylinder-and-piston units defining first and third pressure chambers in a first of the hydraulic units and defining fourth and fifth pressure chambers in a second of the hydraulic units, and wherein the piston of one of the hydraulic units is a stepped piston defining a second pressure chamber, thereby providing five pressure chambers. An arrangement of valves provides for selective coupling of hydraulic fluid among the pressure chambers whereby pressure medium is forced from one of the hydraulic units, during an advance of its piton, to the other of the hydraulic units.

18 Claims, 8 Drawing Sheets

DRIVE DEVICE FOR A MOVABLE PART, ESPECIALLY A MOLD CLOSURE DEVICE FOR AN INJECTION MOLDING MACHINE, AND METHOD FOR OPERATING SUCH A DRIVE DEVICE

The invention relates first of all to a drive device for a movable part in an advance stroke, a power stroke and a return stroke, especially a mold closure device for an injection molding machine.

FIELD AND BACKGROUND OF THE INVENTION

As a mold closure device for an injection molding machine, the drive device moves the movable die platen of the machine. Such a drive device has to satisfy two important requirements. First, it must move the mold platen as fast as possible to close and open the mold, so that the cycle time for the production of a molding can be kept short. Secondly, it must be able to hold the mold platen and hence the entire mold closed with great force against the high injection pressure. First, then, adjustment movements must be performed with high acceleration, high speed and powerful braking; secondly, high forces must be exerted without any substantial movement. Such requirements may arise not only with the closure unit but also with the ejectors or the injection unit of a plastics injection molding machine. For example, when plastic is injected into the mold, the plasticizing screw has to be moved toward the mold at relatively high speed until the mold is completely filled with plastic. If subsequently the plastic contained in the mold is exposed to what is referred to as holding pressure, the drive has to apply a high force without substantial movement of the plasticizing screw.

A mold closure device in which an attempt was made to satisfy the above-mentioned requirements is disclosed in DE 195 23 420. In this drive device, there is connected to the movable mold platen the piston part of a hydraulic cylinder-and-piston unit having a hydraulic piston, which borders with a first active surface on a first pressure chamber and with a second active surface, which is smaller direction thereto, on a second pressure chamber, and comprises a further hydraulic piston, which is fixedly connected to the first hydraulic piston, and possesses a third active surface, which borders on a third pressure chamber and is active in the same direction as the second active surface. Via a valve arrangement, the second pressure chamber can be connected to the first pressure chamber and can be relieved of pressure separately from the first pressure chamber. The further hydraulic piston is formed by a plunger-like projection on the side of the first hydraulic piston facing the second pressure chamber.

During the adjustment movement in the closing direction, the first pressure chamber and the second pressure chamber are connected to one another, so that only the quantity of pressure medium determined by the difference between the first active surface and the second active surface has to flow to the cylinder-and-piston unit and a high speed can be achieved. For the application of the locking force, the second and the third pressure chambers are relieved of pressure, so that the first active surface is fully available to apply the locking force. During the adjustment movement in the opening direction, in the conventional mold closure device, all three pressure chambers are connected to one another and to a source of pressure medium, so that the quantity of pressure medium to be fed to the cylinder-and-piston unit for a desired speed is determined by the cross-sectional surface area of a piston rod starting from the first hydraulic piston, emerging from the cylinder after traversing the first pressure chamber and fixed to the movable part.

In the conventional mold closure device, the cylinder-and-piston unit for closing and opening the mold is operated in open hydraulic circuits, the pressure chambers being connected to a tank at the end of the closure operation and at the end of the opening operation and the movable part evidently being braked only by friction.

SUMMARY OF THE INVENTION

It is an object of the invention further to develop a drive device of the conventional type so that it can be operated at higher dynamics.

This object is achieved with a drive device according to the invention. In this drive device, a first, receiving hydraulic cylinder-and-piston unit has a first pressure chamber, which can be subjected to the action of pressure in the power stroke alone, and a third pressure chamber to be subjected to the action of pressure on the return stroke. A second, delivering cylinder-and-piston unit has a fourth pressure chamber which is connected to the third pressure chamber at least on the advance stroke and on the return stroke, and a fifth pressure chamber which can be connected to the first pressure chamber. By a drive motor, in particular an electric drive motor, the piston part and cylinder of the second cylinder-and-piston unit are movable relative to one another. A second pressure chamber of the drive device is located in one of the two cylinder-and-piston units. A valve arrangement is present via which, during the advance stroke, pressure medium can be forced from the second pressure chamber into the first pressure chamber and, during the power stroke, the second pressure chamber can be relieved of pressure separately from the first pressure chamber. In addition, the third pressure chamber and the fourth pressure chamber have cross sections such that pressure medium forced out of the third pressure chamber during the advance stroke can be received by the fourth pressure chamber. The fourth pressure chamber may be permanently connected to the third pressure chamber. However, the fourth pressure chamber may also be formed by two partial pressure chambers, of which, during a working step to tear open the mold, only one partial pressure chamber is connected to the third pressure chamber. In this manner, the active size of the fourth active surface is diminished. A stronger force transmission can be achieved.

The method according to the invention for operating a drive device according to the invention is one characterized in that, during the movement of the movable part, all five pressure chambers are subjected to the action of an elevated pressure greater than atmospheric pressure. Preferably, the pressure during the braking of the movable part remains above atmospheric pressure in each of the five pressure chambers, so that the braking force is particularly high and the braking travel correspondingly short.

Advantageous embodiments of a drive device according to the invention are listed below.

The second pressure chamber of a drive device according to the invention may be located on the second cylinder-and-piston unit.

However, particular preference is given to an embodiment in which the first hydraulic cylinder-and-piston unit comprises a first hydraulic piston, which borders with a first active surface on the first pressure chamber and with a second active surface, which is smaller than the first active surface and faces in the opposite direction thereto, on the second pressure chamber, and comprises a further hydraulic piston, which is fixedly connected to the first hydraulic piston, and possesses a third active surface, which borders on the third pressure chamber and is active in the same direction as the second active surface. The second hydraulic cylinder-and-piston unit comprises a second hydraulic piston, which is connected to a fourth active surface at the fourth pressure chamber, which is permanently connected to the third pressure chamber, and borders with a fifth active surface, which faces in the opposite direction to the fourth active surface, on the fifth pressure chamber. In addition, the dimensional relationship between the fifth active surface and the difference between the first and second active surfaces is equal to the dimensional relationship between the fourth active surface and the third active surface.

Particularly preferably, the further hydraulic piston is formed in a simple manner by a plunger-like projection on the side of the first hydraulic piston or second hydraulic piston facing the second pressure chamber.

Advantageously, in a drive device according to the invention, the first cylinder-and-piston unit is formed in the same way as that according to DE 195 23420 C1.

If either the third pressure chamber or the fourth pressure chamber comprises a first partial pressure chamber and a second partial pressure chamber, of which one partial pressure chamber is connected jointly with the other partial pressure chamber via a valve to the other pressure chamber and can be connected separately from the partial pressure chamber connected to the other pressure chamber to a low-pressure tank, a force transmission to tear open the mold of a plastic injection molding machine is possible.

Preferably, the fourth pressure chamber and the third pressure chamber can be connected via a valve to a low-pressure tank. This reliably prevents the formation of a vacuum in the third and in the fourth pressure chambers when a high pressure is built up in the first pressure chamber by movement of the second hydraulic piston, during which time the first hydraulic piston and the further hydraulic piston move only slightly, if at all. The risk of cavitation is then slight. The low-pressure tank is expediently a closed tank with no connection to atmosphere and with a volume compensation provided by a flexible wall or a gas cushion. In this manner, the hydraulic system of the drive device can be so formed that the pressure medium has no contact with atmosphere. If the pressure medium is oil, this slows the process of aging. If the pressure medium is water, this results in no oxygen being introduced from the atmosphere so that corrosion of the metal parts that come into contact with the water is minimized.

It is advantageous if the fifth active surface on the second hydraulic piston is smaller than the first active surface on the first hydraulic piston. The second hydraulic piston and the first hydraulic piston then form a hydraulic force transmitter, so that with a relatively low load on the drive motor and on a rotation/translation converter installed downstream thereof a high force can be exerted with the first hydraulic piston. The force transmission naturally corresponds to a reduction of travel.

The drive device can be operated at particularly high dynamics if it is operated with elevated prestress pressures in the pressure chambers. In order to permit such operation in an advantageous manner, the fifth pressure chamber on the second hydraulic piston is connected in a first position of a further valve to the first pressure chamber and in a second position of the further valve to the low-pressure tank. In a "prestress" working step before the opening of the mold, it is now possible, by moving the second hydraulic piston in the "mold opening" direction, for pressure medium to flow from the low-pressure tank into the fifth pressure chamber, so that after the further valve has been switched over and the fifth pressure chamber connected to the first pressure chamber, the level of the prestress pressures is largely maintained. The level falls only slightly, because the pressure medium present in the fifth pressure chamber is raised to the pressure level of the first pressure chamber.

BRIEF DESCRIPTION OF THE DRAWINGS

Four examples of embodiment of a drive device according to the invention, which are conceived as mold closure devices, are shown in the drawings. The invention will now be explained in detail with reference to those drawings, in which.

DETAILED DESCRIPTION OF THE PREFERRED EMBODIMENT

According to FIGS. 1 to 5, the first example of embodiment of a mold closure device, shown there only in sketch form, possesses a first, receiving cylinder-and-piston unit 10, which is mechanically coupled to the movable mold platen 11 of a two-platen plastics injection molding machine, a rotary electric motor 12 as the drive motor and a second, delivering cylinder-and-piston unit 13 disposed in the power chain between the electric motor 12 and the first cylinder-and-piston unit. The cylinder 14 of the first cylinder-and-piston unit 10 is fixedly connected to the frame of the machine and forms a first cavity 15 having a regular cylindrical cross section and a second cavity 16 having a regular cylindrical cross section, the diameter of which is less than the diameter of the cavity 15 and which is open toward the cavity 15.

The cylinder-and-piston unit 10 comprises two hydraulic pistons 17 and 18 disposed in the same plane and combined to form a stepped piston. The first hydraulic piston 17 is located in the cavity 15 and divides the latter sealingly into a first pressure chamber 19 and a second pressure chamber 20, which is located on the side of the hydraulic piston 17 facing the cavity 16. On the other side, a piston rod 21 projects away from the hydraulic piston 17, traverses the pressure chamber 19, emerges outward from the cylinder 14 and is fixed to the mold platen 11 which is movably guided on the machine frame. The further hydraulic piston 18 projects in the manner of a plunger away from the side of the hydraulic piston 17 facing the cavity 16 and dips sealingly into the cavity 16. The pressure chamber 19 is bordered by the hydraulic piston 17 with an annular active surface 22 (first active surface of the drive device), whose size is determined by the diameter of the cavity 15 and the diameter of the piston rod 21. The pressure chamber 20 is bordered by the hydraulic piston 17 with an annular active surface 23 (second active surface of the drive device), whose size is determined by the diameter of the cavity 15 and the diameter of the plunger piston 18. The diameter of the plunger piston 18 is greater than the diameter of the piston rod 21, so that the active surface 22 is greater than the active surface 23.

The plunger piston 18 borders, with a third active surface 24, whose size is equal to the cross section of the plunger piston and which points in the same direction as the second active surface 23, on a third pressure chamber 25. The active surface 24, in the embodiment of the hydraulic pistons 17 and 18 shown, is naturally greater than the difference between the first active surface 22 and the second active surface 23.

The second, delivering cylinder-and-piston unit 13 is, in the example of embodiment shown in FIGS. 1 to 5, a simple differential cylinder having a cylinder 29 and having a hydraulic piston 30 and having a piston rod 31. The cylinder space of the differential cylinder is sealingly subdivided by the hydraulic piston 30 into a non-piston-rod side pressure chamber 32 (fourth pressure chamber of the drive device) of regular cylindrical cross section, on which borders the hydraulic piston 30 with a regular cylindrical active surface 33 (fourth active surface of the drive device) and a piston-rod side pressure chamber 34 (fifth pressure chamber of the drive device) of annular cylindrical cross section, on which borders the hydraulic piston 30 with an annular cylindrical active surface 35 (fifth active surface of the drive device). The sizes of the five active surfaces are so selected that the dimensional relationship between the fifth active surface 35 and the difference between the first active surface 22 and the second active surface 23 is equal to the dimensional relationship between the fourth active surface 33 and the third active surface 24.

The piston rod 31 is connected to a threaded spindle 36 which is secured against twisting. The electric motor 12 is a hollow rotor having a hollow shaft 37, which is provided with an internal thread with which the threaded spindle 36 is in engagement directly or via ball bearings. The hollow shaft is thus the spindle nut of a rotation/translation converter 38 comprising spindle nut and threaded spindle.

According to the figures, the two pressure chambers 25 and 32 are permanently connected to one another via a line 39. Connected to this line 39 is a 2/2-way seat valve 40, which in the fully open position that it adopts in FIGS. 2 and 3 connects the line 39 to a low-pressure tank 41 for a pressure medium. The pressure medium may be hydraulic oil or water. Irrespective thereof, the low-pressure tank is completely closed toward atmosphere. A compensation system for various quantities of pressure medium to be received is permitted by a flexurally slack or elastic wall 42. Depending on the tension under which the wall is placed, the pressure in the tank is equal to atmospheric pressure or slightly higher.

Figure 2:
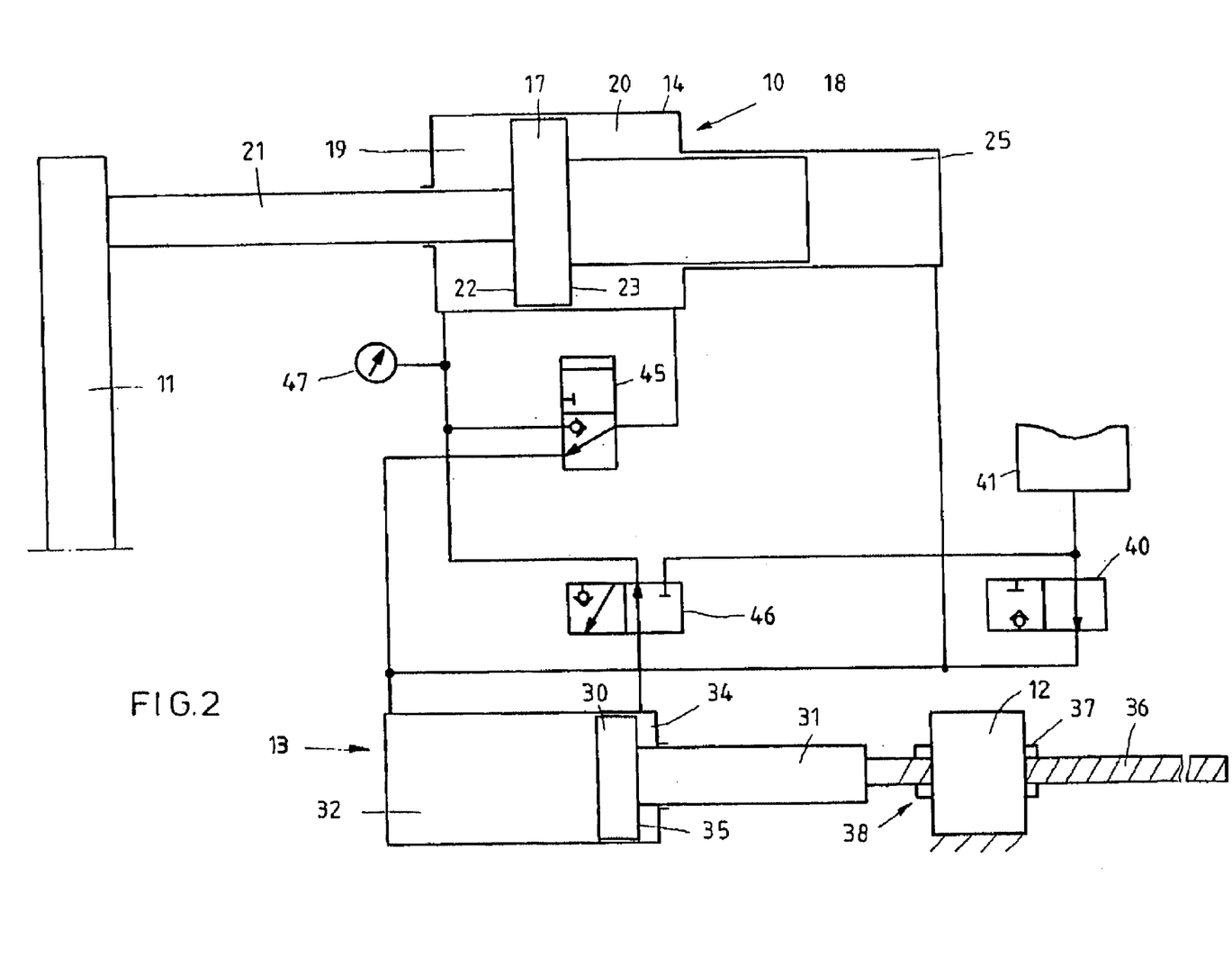
FIG. 2 shows the first example of embodiment at the end of the locking of the mold, in other words at the end of the build-up of a high pressure in pressure chambers one and five to hold the mold closed.
Figure 3:
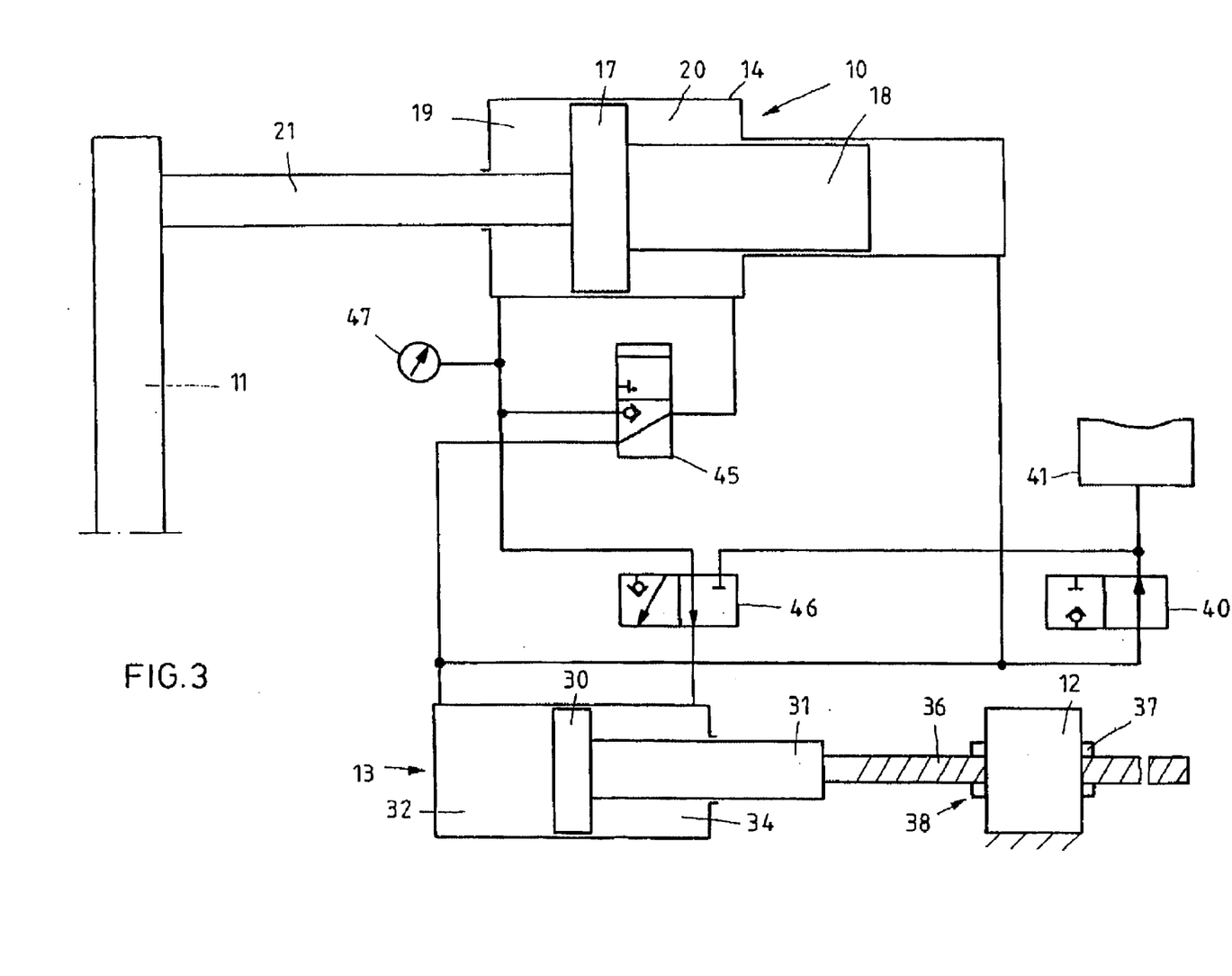
FIG. 3 shows the first example of embodiment after the delivering of the mold, in other words after the reduction of the high pressure in pressure chambers one and five to hold the mold closed.

The mold closure device shown comprises, in addition to the 2/2-way seat valve 40, a further two directional seat valves 45 and 46 with three connections and two switching positions, which, as in the case moreover of the valve 40, can preferably be brought by a solenoid against the force of a spring from one switching position into the other switching position and are restored again by the spring. Of the three connections of a first 3/2-way seat valve 45, one connection is connected to the first pressure chamber 19, one connection to the second pressure chamber 20 and one connection to the line 39, the two pressure chambers 19 and 20 being open to one another in a first switching position of the valve 45, which it adopts in the illustration shown in FIGS. 1, 4 and 5. The connection connected to the line 39 is shut off from the other two connections. In the other switching position of the valve 45, which is shown in FIGS. 2 and 3, the pressure chamber 20 is connected to the line 39, while the connection to the pressure chamber 19 is shut off.

Figure 4:
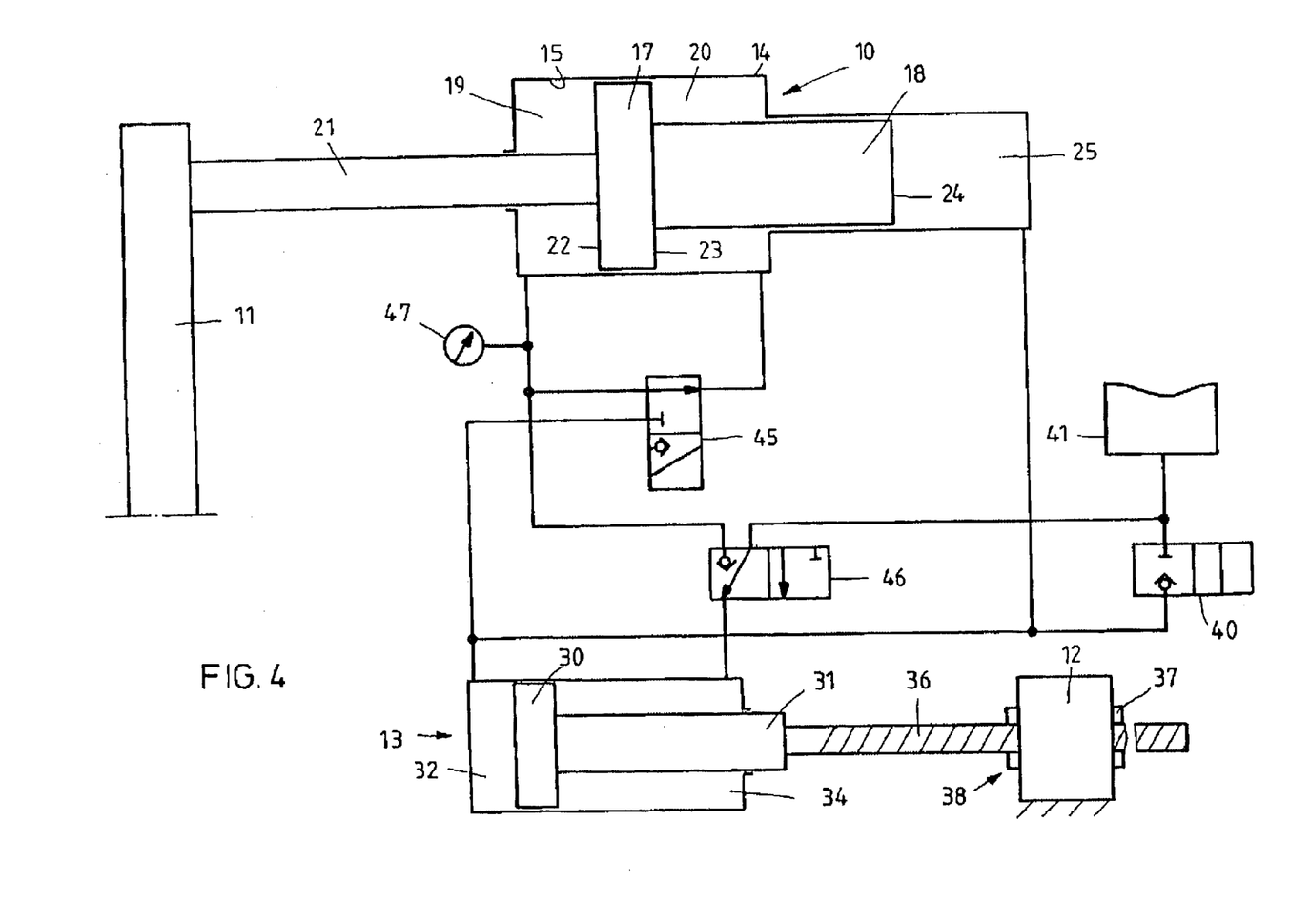
FIG. 4 shows the first example of embodiment after the build-up of prestress pressures in pressure chambers one to four.

The further valve 46 connects the fifth pressure chamber 34, in one switching position which is shown in FIGS. 1, 2, 3 and 5, to the first pressure chamber 19 and in the other switching position, which is shown in FIG. 4, to the low-pressure tank 41. The further connection which is not necessary in each case is shut off.

The two valves 40 and 45, which are each switched at the same time, can also be combined to form a single 4/2-way valve, which valve, by comparison with the valve 45, would have a fourth connection connected to the low-pressure tank 41.

Figure 1:
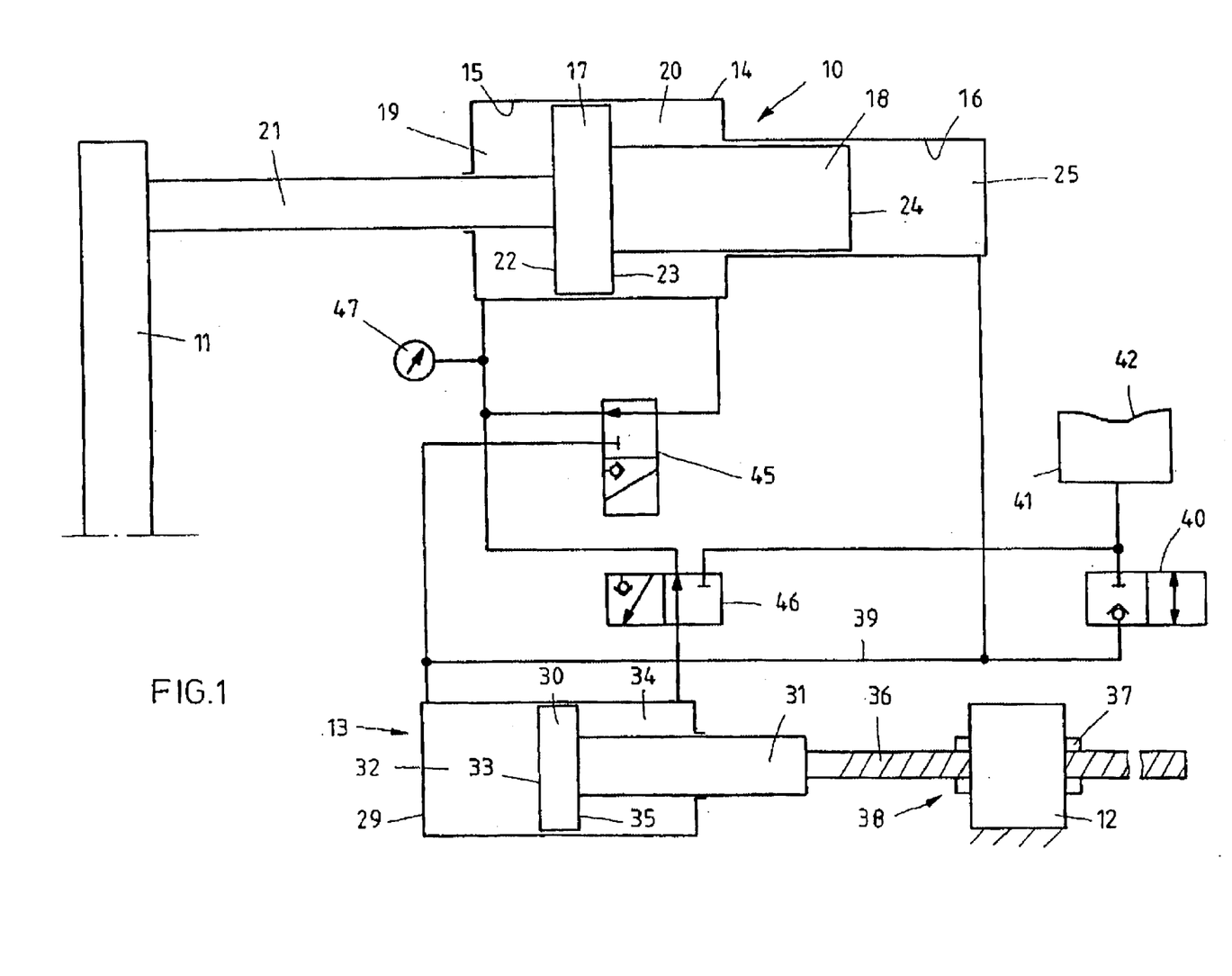
FIG. 1 shows the first example of embodiment in a position occurring during the closure of the mold.

In FIG. 1, the mold is just being closed. The valve 40 is in the closed position, the valve 45 connects the two pressure chambers 19 and 20 to one another and the valve 46 the two pressure chambers 34 and 19. The electric motor 12 is operated, during the closure of the mold, in a direction of rotation such that the threaded spindle 36, the piston rod 31 and the hydraulic piston 30 move toward the right as seen in FIG. 1. As a result, pressure medium is forced from the pressure chamber 34 via the valve 46 into the pressure chamber 19 of the cylinder-and-piston unit. The hydraulic piston 17 moves toward the right and, via the piston rod 21, carries with it the mold platen 11. For a particular travel of the hydraulic piston 17 in this case it is only necessary for a volume of pressure medium to flow out of the pressure chamber 34 to the pressure chamber 19 which is equal to the difference in surface area between the two active surfaces 22 and 23 multiplied by the travel of the hydraulic piston 17. The remaining increase in volume of the pressure chamber 19 is filled by the pressure medium forced out of the pressure chamber 20. As the difference between the two active surfaces 22 and 23 is much less than the active surface 35, the hydraulic piston 17 covers, for a particular travel of the hydraulic piston 30, a much greater travel. The pressure medium forced out of the pressure chamber 25 is entirely received by the pressure chamber 32, as the dimensional relationship of the active surface 33 and hence of the cross section of the pressure chamber 32 to the active surface 24 and hence to the cross section of the pressure chamber 25 is equal to the dimensional relationship of the active surface 35 and hence of the cross section of the pressure chamber 34 to the difference between the active surfaces 22 and 23 and hence to the difference between the cross sections of the pressure chambers 19 and 20.

As the pressure chambers 19, 20 and 34 are connected to one another, the same pressure prevails in them, apart from minor flow losses. In the pressure chambers 25 and 32 the pressure, considering a static state, is far higher than atmospheric pressure. Therefore the pressure in the pressure chambers 19, 20 and 34 is also elevated. This is described as a prestressed system. The effect of this prestress is that, in the event of a movement of the hydraulic piston 30 from the position of rest, not only does the pressure increase in the pressure chambers 19, 20 and 34 as a result of the diminution of the pressure chamber 34, but also the pressure in the pressure chambers 25 and 32 falls because of the diminution of the pressure chamber 32, as the hydraulic pistons 17 and 18 cannot initially follow the hydraulic piston 30 because of their own inertia and the inertia of the movable mold platen 11. Because the force acting in the closing direction increases and the counterforce falls, a large force resultant is also obtained for the acceleration of the mold platen 11.

Shortly before the mold has closed, the hydraulic piston 30 comes to a halt. Because of inertia, the hydraulic pistons 17 and 18 move onward, so that the pressure in the pressure chambers 25 and 32 rises sharply and that in the pressure chambers 19, 20 and 34 falls sharply. A large force results, whereby the mold platen 11 is braked. The prestress pressures are so great that the pressure does not fall below atmospheric pressure in any of the pressure chambers either during the acceleration or during the braking of the mold platen. Cavitation is thus prevented. A very great resultant force is also obtained in each case. If in fact atmospheric pressure were reached, a further pressure drop would in practice make no further contribution to increasing the force resultant.

When the mold is closed, the two valves 40 and 45 are switched over and then adopt the positions shown in FIG. 2. The pressure chambers 20, 25 and 32 are then connected to the low-pressure tank 41, so that a pressure equal or close to atmospheric pressure prevails therein. The valve 46 continues to connect the two pressure chambers 19 and 34 to one another. During the further movement of the hydraulic piston 30 toward the right, while the hydraulic pistons 17 and 18 and the mold platen 11 move only slightly, if at all, a high locking force now builds up in the pressure chambers 34 and 19. This pressure generates, on the one hand, only a slight force at the relatively small active surface 35 of the hydraulic piston 30, which force must be absorbed by the rotation/translation converter 38, and on the other hand a high mold locking force at the active surface 22 of the hydraulic piston 17, which active surface 22 is larger than the active surface 36 and is now fully effective because of the let-down of the pressure chambers 20 and 25. The increase in size of the pressure chamber 32 is compensated by the inflow of pressure medium from the low-pressure tank 41.

When the injection operation has ended, the high pressure in the pressure chambers 19 and 34 is initially let down to the pressure or close to the pressure in the low-pressure tank 41, the hydraulic piston 30 being moved toward the left by operating the electric motor 12 in the corresponding direction of rotation. When this occurs, pressure medium is forced out of the pressure chamber 32 via the valve 40 into the low-pressure tank 41.

After the reduction of pressure, all three valves 40, 45 and 46 are switched over, so that, as shown in FIG. 4, the pressure chamber 34 is connected to the low-pressure tank via the valve 46 and the two pressure chambers 19 and 20 to one another via the valve 45. There now follows a phase in which the prestress pressures for the displacement of the movable mold platen 11 are built up. For this purpose, the hydraulic piston 30 is moved further toward the left and the pressure chamber 34 is thereby reduced in size and the pressure medium in the pressure chambers 25 and 32 compressed. The pressure in the pressure chamber 25 generates a force at the active surface 24 of the hydraulic piston 18 which acts on the structural unit comprising the hydraulic pistons 17 and 18 in a manner such as to push the piston rod 21 out and push the hydraulic piston 18 into the cavity 15 of the cylinder 14, and thus, because the cross section of the hydraulic piston 18 is greater than the cross section of the piston rod 21, in a manner such as to reduce the size of the free volume of the cavity 15. Therefore, if compressibility is disregarded, the hydraulic pistons 17 and 18 do not move. The pressure in the pressure chambers 19 and 20 rises, rather, to a value such that the force acting on the hydraulic piston 17 is equal to the force acting on the hydraulic piston 18. During the build-up of the prestress pressure, pressure medium flows out of the low-pressure tank 41 via the valve 46 into the enlarging pressure chamber 34.

Connected to the pressure chamber 19 is a pressure sensor whereby the prestress pressure and the locking force are monitored. Instead of or in addition to the pressure sensor connected to the pressure chamber 19, one pressure sensor could be provided to record the pressure in each of the pressure chambers 32 and 34.

Once the desired prestress pressure has been reached, the valve 46 is switched over. This may take place slowly, so that the pressure compensation between the pressure chambers 19 and 20 on the one hand and the pressure chamber 34 on the other takes place gently. The hydraulic piston 30 is moved from the position shown in FIG. 4 further toward the left. The hydraulic pistons 17 and 18, the piston rod 21 and the mold platen 11 follow this movement, because the pressure medium, which is forced out of the pressure chamber 19, can flow, to the extent that it exceeds the capacity of the pressure chamber 20 to receive it, into the enlarging pressure chamber 34. During the acceleration and braking of the mold platen 11, high forces again take effect, as the pressure rises in the pressure chamber 25 and falls in the pressure chambers 19 and 20 during acceleration and rises in the pressure chambers 19 and 20 and falls in the pressure chamber 25 during braking.

In the phase of build-up of the prestress pressures, the positions of the valves 40, 45 and 46 for which are shown in FIG. 4, the hydraulic piston 30 is moved toward the left, so that even allowing for any leakages during the performance of the adjustment movements and during locking it could drift toward the left. This drift can be compensated by a reference movement when necessary or regularly during each working cycle, for which purpose the position of the hydraulic piston 30 is recorded directly by a travel indicator, not shown in detail, or indirectly by an angle indicator on the electric motor 12. The reference movement can, for example, be performed before the build-up of the prestress pressures. For this purpose, the valve 46 is brought into the position shown in FIG. 4 and the valve 40 into the fully open position, after the pressure reduction following an injection operation has ended. The hydraulic piston can then be brought toward the right into the starting position for the prestress phase, pressure medium being forced out of the pressure chamber 34 and flowing via the valves 46 and 40 to the pressure chamber 32. The reference movement can also be performed after the closure of the mold and before the build-up of the locking pressure, the two valves 40 and 46 again being brought into the above-mentioned positions. It is advantageous here if the direction of movement of the hydraulic piston 30 need not be changed between the closure and locking of the mold.

Figure 5:
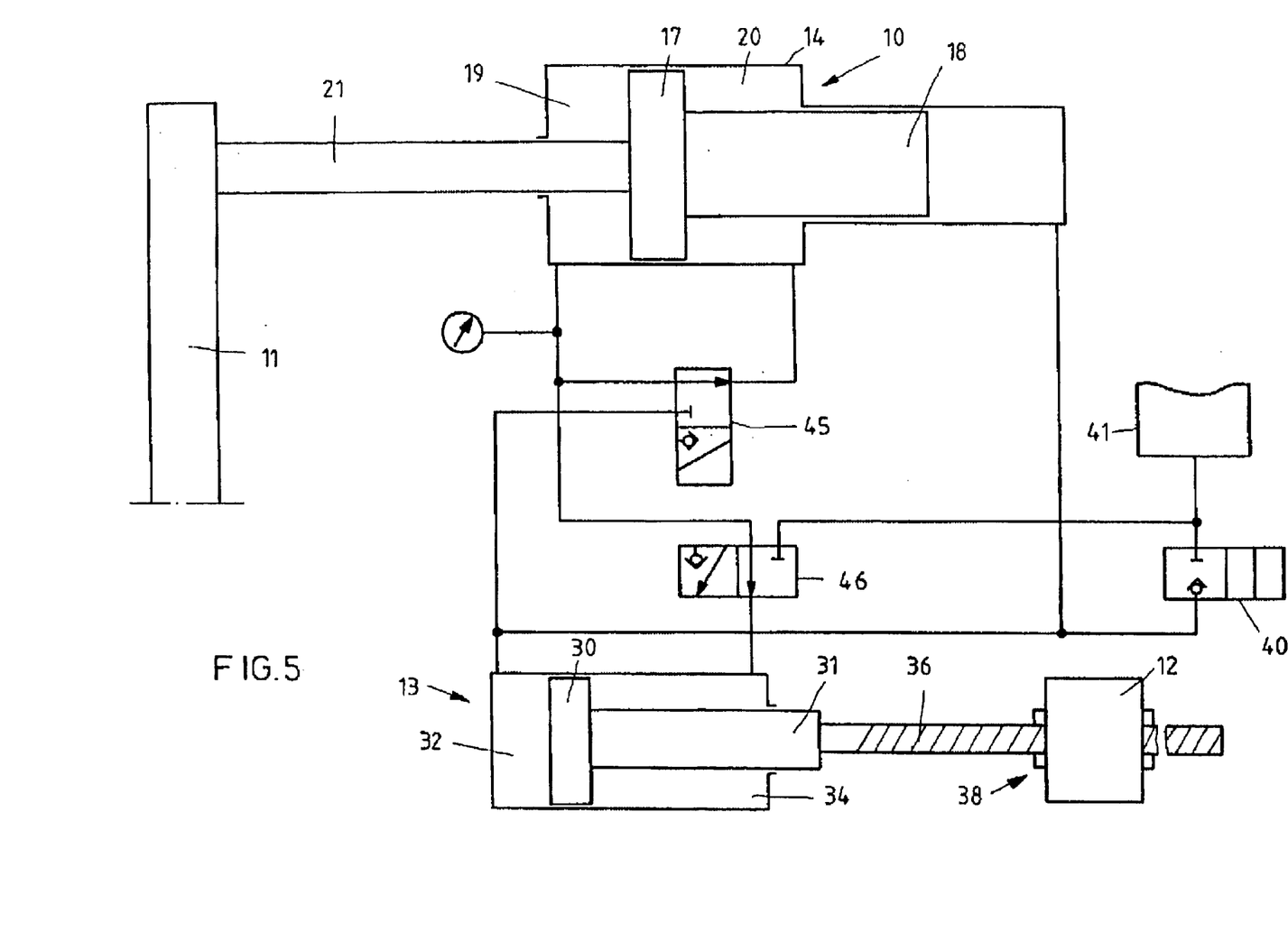
FIG. 5 shows the first example of embodiment in a position occurring at the start of the opening of the mold.
Figure 6:
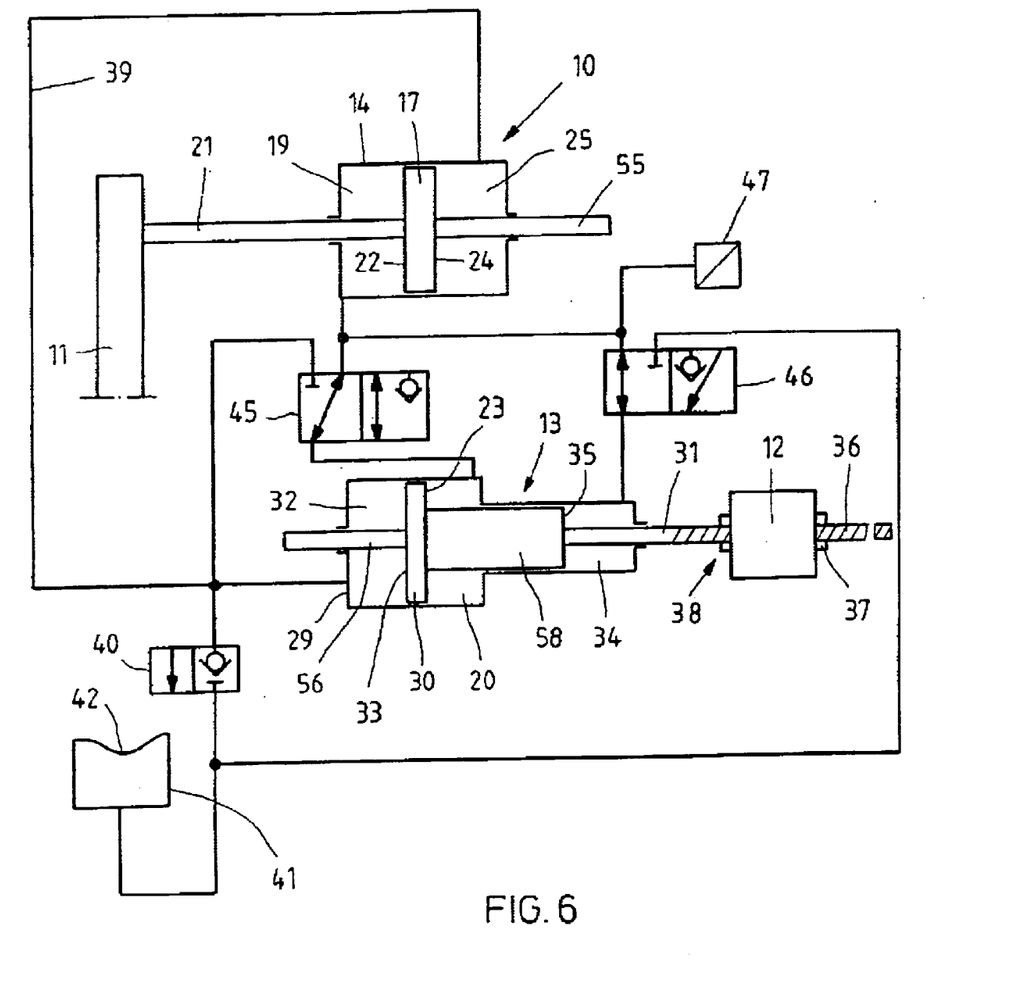
FIG. 6 shows the second example of embodiment in a position occurring during the closure of the mold.

In the example of embodiment shown in FIG. 6, the individual components and pressure chambers, where they correspond to components and pressure chambers of the example of embodiment in accordance with FIGS. 1 to 5, are provided with the same reference numerals. According to FIG. 6, the mold closure device which is merely sketched there possesses, exactly like the first example of embodiment, a first, receiving cylinder-and-piston unit 10, which is mechanically coupled to the movable mold platen 11 of a two-platen plastics injection molding machine, a rotary electric motor as the drive motor and a second, delivering cylinder-and-piston unit 13 disposed in the power chain between the electric motor 12 and the first cylinder-and-piston unit. Once again, the cylinder 14 of the first cylinder-and-piston unit 10 is fixedly connected to the frame of the machine. In contrast to the example of embodiment shown in FIGS. 1 to 5, the receiving cylinder-and-piston unit 10 is now a simple double-rod cylinder whose hydraulic piston 17 has on one side the piston rod 21 connected to the movable mold platen 11 and borders on that side with the (first) active surface 22 on the first pressure chamber 19. On the other side of the hydraulic piston 17 is a pressure chamber, which corresponds to the third pressure chamber 25 of the example of embodiment shown in FIGS. 1 to 5 and which because of an additional piston rod 55 is exactly the same size in cross section as the pressure chamber 19 and borders on the hydraulic piston 17 with a (third) active surface 24, which is exactly the same size as the active surface 22.

Instead of the receiving cylinder-and-piston unit 10, the second, delivering cylinder-and-piston unit 13 now comprises two hydraulic pistons disposed in the same axis, which are combined to form a stepped piston. One hydraulic piston 30 (second hydraulic piston of the drive device) divides the part of the cylinder 29 that is larger in diameter into an annular (fourth) pressure chamber 32 and a further pressure chamber. The latter corresponds to the second pressure chamber 20 of the first cylinder-and-piston unit of the first example of embodiment and is therefore provided with the same reference numeral. The hydraulic piston 30 borders with a (fourth) active surface 33 on the pressure chamber 32, the active surface 33, because of a piston rod 58 traversing the pressure chamber 32 and having the same diameter as the piston rod 55, and because of its cylinder diameter, being exactly the same size as the active surface 24 of the hydraulic piston 17. The pressure chamber 32 is permanently connected via the line 39 to the pressure chamber 25.

As in the first example of embodiment, connected to this line 39 is a 2/2-way seat valve 40, which in the fully open position connects the line 39 to a low-pressure tank 41 having a flexurally slack or elastic wall.

On the side remote from the piston rod 56, there is attached to the hydraulic piston 30 a hydraulic piston 58 of lesser diameter, whose diameter is greater than that of the piston rod 56 and which dips sealingly, in the manner of a plunger, into the smaller-diameter part of the cylinder 29. The pressure chamber 20, like the pressure chamber 32, is annular. The active surface 23 of the hydraulic piston 30 bordering on the pressure chamber 20 is likewise annular. Because the diameter of the plunger piston 56 is greater than the diameter of the piston rod 58, the active surface 33 is larger than the active surface 23. The plunger piston 58 borders, with a (fifth) active surface 35 whose size is equal to the cross section of the plunger piston and which points in the same direction as the second active surface 23, on a (fifth) pressure chamber 34, which is permanently connected to the pressure chamber 19.

A piston rod 31 projects away from the plunger piston 58 and traverses the pressure chamber 34, has the same diameter as the piston rod 56 and is connected to a threaded spindle 36, which is secured against twisting and is in engagement directly or via ball bearings with the hollow shaft 37, provided with an internal thread, of the electric motor 12. The hollow shaft is thus the spindle nut of a rotation/translation converter 38 comprising spindle nut and threaded spindle.

In the second example of embodiment, the sizes of the five active surfaces 22, 23, 24, 33 and 35 are selected so that the dimensional relationship of the sum of the fifth active surface 35 and the second active surface 23 and the first active surface 22 is equal to the dimensional relationship between the fourth active surface 33 and the third active surface 24.

The mold closure device shown in FIG. 6 comprises, like those shown in FIGS. 1 to 5, in addition to the 2/2-way seat valve 40, a further two directional switching valves 45 and 46 with three connections and two switching positions. As in the first example of embodiment, of the three connections of the valve 45, one connection is connected to the first pressure chamber 19, one connection to the second pressure chamber 20 and one connection to the line 39, the two pressure chambers 19 and 20 being open to one another in a first switching position of the valve 45, which it adopts in the illustration shown in FIG. 6. The connection connected to the line 39 is shut off from the other two connections. In the other switching position of the valve 45, which is shown in FIGS. 2 and 3, the pressure chamber 20 is connected to the line 39, while the connection to the pressure chamber 19 is shut off.

The further valve 46 connects the fifth pressure chamber 34, in one switching position, which is shown in FIG. 5, to the first pressure chamber 19 and in the other switching position to the low-pressure tank 41. The further connection which is not necessary in each case is shut off.

As in the second example of embodiment, the two valves 40 and 45, which are each switched at the same time, can also be combined to form a single 4/2-way seat valve, which valve, by comparison with the valve 45, would have a fourth connection connected to the low-pressure tank 41.

When the mold is closed, the valves 45 and 46 adopt the switching positions shown in FIG. 6. The valve 45 connects the two pressure chambers 19 and 20 to one another and the valve 46 the two pressure chambers 19 and 34. The valve 40 is in the closed position. The electric motor 12 is operated, during the closure of the mold, in a direction of rotation such that the threaded spindle 36, the piston rod 31 and the hydraulic pistons 30 and 58 move toward the right as seen in FIG. 1. As a result, pressure medium is forced from the pressure chambers 20 and 34 of the second cylinder-and-piston unit 13 into the pressure chamber 19 of the cylinder-and-piston unit 10. The hydraulic piston 17 moves toward the right and, via the piston rod 21, carries with it the mold platen 11. Because the piston rods 21 and 31 have the same diameter, the travels of the hydraulic pistons 30 and 58 on the one hand and of the hydraulic piston 17 on the other are the same. The pressure medium forced out of the pressure chamber 25 is entirely received by the pressure chamber 32, because these two pressure chambers are the same size.

Shortly before the mold has closed, the hydraulic pistons 30 and 58 come to a halt. Because of inertia, the hydraulic piston 17 moves onward, so that the pressure in the pressure chambers 25 and 32 rises sharply and the hydraulic piston 17 is braked.

When the mold is closed, the two valves 40 and 45 are switched over. The pressure chambers 20, 25 and 32 are then connected to the low-pressure tank 41, so that a pressure equal or close to atmospheric pressure prevails therein. During the further movement of the hydraulic pistons 30 and 58 toward the right, while the hydraulic piston 17 and the mold platen 11 move only slightly, if at all, a high looking pressure now builds up in the pressure chambers 34 and 19. This pressure generates, on the one hand, only a slight force at the relatively small active surface 35 of the hydraulic piston 30, which force must be absorbed by the rotation/translation converter 38, and on the other hand a high mold locking force at the active surface 22 of the hydraulic piston 17, which active surface 22 is larger than the active surface 35. The increase in size of the pressure chamber 32 is compensated by the inflow of pressure medium from the pressure chamber 20 and from the low-pressure tank 41.

When the injection operation has ended, the high pressure in the pressure chambers 19 and 34 is initially reduced to the pressure or close to the pressure in the low-pressure tank 41, the hydraulic pistons 30 and 58 being moved toward the left by operating the electric motor 12 in the corresponding direction of rotation. When this occurs, pressure medium is forced out of the pressure chamber 32 via the valve 40 into the low-pressure tank 41.

After the reduction of pressure, the two valves 40 and 46 are switched over, so that the pressure chamber 34 is connected to the low-pressure tank 41 via the valve 46 and the pressure chambers 20, 25 and 32 are separated from the low-pressure tank. There now follows a phase in which the prestress pressures for the displacement of the movable mold platen 11 are built up. For this purpose, the hydraulic piston 30 is moved further toward the left and the pressure chamber 32 is thereby reduced in size and the pressure medium in the pressure chambers 20, 25 and 32 compressed. The pressure in the pressure chamber 25 generates a force at the active surface 24 of the hydraulic piston 17 which acts in a manner such as to push the piston rod 21 out of the cylinder 14 and reduce the size of the pressure chamber 19. Since no pressure medium can escape from the pressure chamber 19, the same pressure develops in the pressure chamber 19 as in the pressure chambers 20, 25 and 32. During the build-up of the prestress pressure, pressure medium flows out of the low-pressure tank 41 via the valve 46 into the enlarging pressure chamber 34.

Connected to the pressure chamber 19 is a pressure sensor 47 whereby the prestress pressure and the locking pressure are monitored. Instead of or in addition to the pressure sensor connected to the pressure chamber 19, one pressure sensor could be provided to record the pressure in each of the pressure chambers 32 and 34.

Once the desired prestress pressure has been reached, the valves 45 and 46 are switched over, so that the configuration of the valves is once again as shown in FIG. 6. The switching may take place slowly, so that the pressure compensation between the pressure chambers 19 and 20 on the one hand and the pressure chamber 34 on the other takes place gently. The hydraulic piston 30, and with it the hydraulic piston 58, is moved further toward the left. The hydraulic piston 17, the piston rod 21 and the mold platen 11 follow this movement, because the pressure medium, which is forced out of the pressure chamber 19, can flow into the enlarging pressure chambers 20 and 34. During the acceleration and braking of the mold platen 11, high forces again take effect, as the pressure rises in the pressure chamber 25 and falls in the pressure chambers 19 and 20 during acceleration and rises in the pressure chambers 19 and 20 and falls in the pressure chamber 25 during braking.

In the second example of embodiment, the following are examples of what appear to be favorable values for the individual active surfaces:

| First active surface 22: | 100 units of area |
|---|---|
| Second active surface 23: | 90 units of area |
| Third active surface 24: | 100 units of area |
| Fourth active surface 33: | 100 units of area |
| Fifth active surface 35: | 10 units of area |

Figure 7:
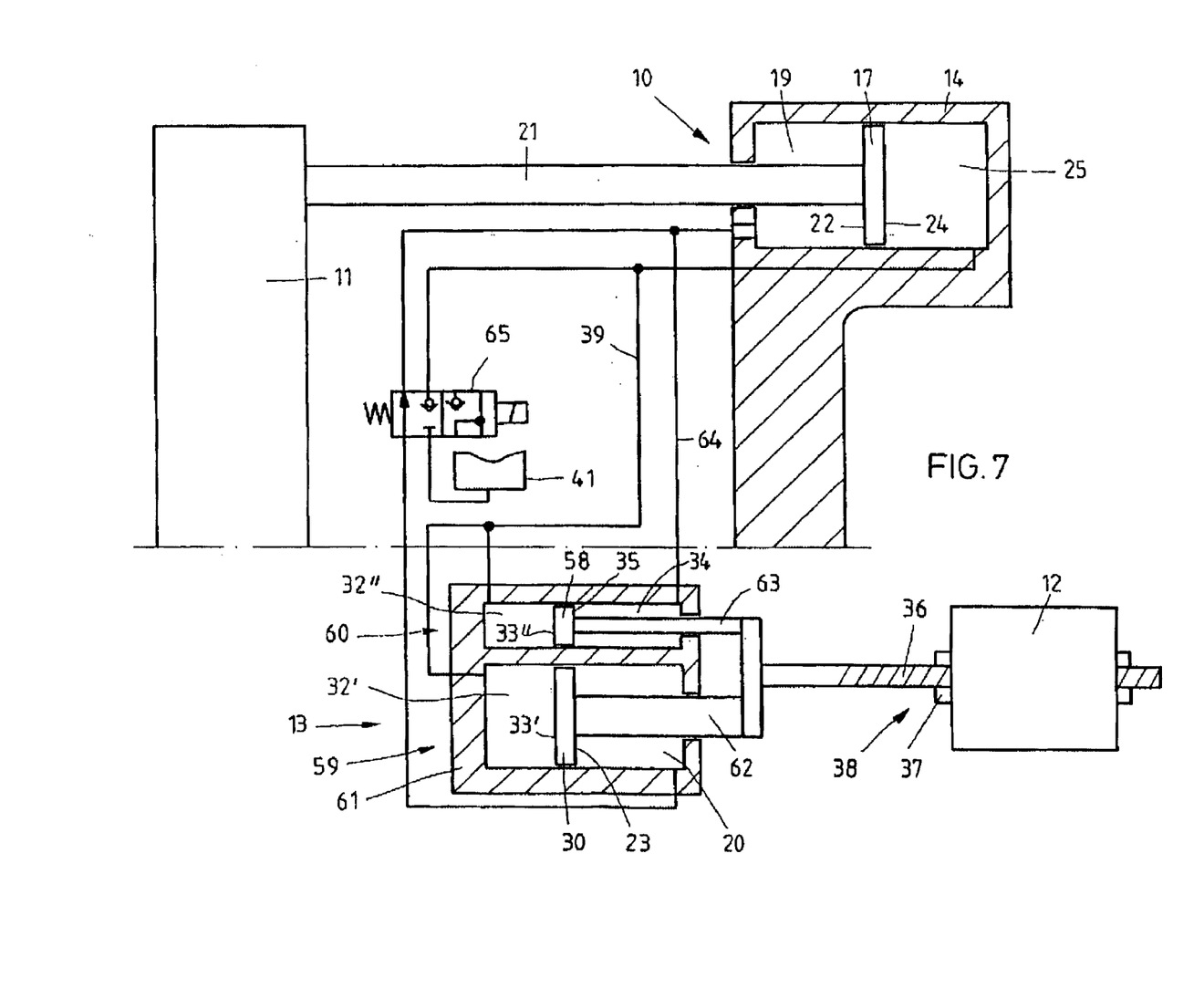
FIG. 7 shows the third example of embodiment in a position occurring during the closure of the mold.

The example of embodiment shown in FIG. 7 is identical to the example of embodiment shown in FIG. 6 to the extent that here again only the first pressure chamber 19 and the third pressure chamber 25 are located at the receiving 20, the fourth pressure chamber 32 and the fifth pressure chamber 34 are located at the delivering cylinder-and-piston unit 13. Apart from the pressure chambers, the individual components of the example of embodiment shown in FIG. 7, where they correspond to components of the examples of embodiment in accordance with FIGS. 1 to 6, are provided with the same reference numerals. The receiving cylinder-and-piston unit 10 is, according to FIG. 7, a differential cylinder having a cylinder 14 which is fixedly connected to the frame of a machine and having a hydraulic piston 17 formed as a differential piston, which is connected via a piston rod 21 to the movable mold platen 11. On the piston-rod side of the hydraulic piston 17 is the annular first pressure chamber 19 and on the non-piston-rod side is the third pressure chamber 24, which is completely cylindrical and thus larger than the first pressure chamber by the cross section of the piston rod 21. The hydraulic piston 17 borders on the first pressure chamber 19 with the first active surface 22 and on the third pressure chamber 25 with the third active surface 24.

In contrast to the example of embodiment in accordance with FIG. 6, the second, delivering cylinder-and-piston unit 13 now has two differential cylinders 59 and 60 arranged side by side in parallel and having a common cylinder housing 61, in which are two cylinder chambers whose cross sections differ in size. The hydraulic piston received by the larger cylinder space substantially corresponds to the hydraulic piston 30 and the hydraulic piston received by the smaller cylinder space substantially corresponds to the hydraulic piston 58 of the example of embodiment from FIG. 6. Both hydraulic pistons 30 and 58 are differential pistons, from which piston rods 62 and 63 extend in the same direction, these being fixedly connected to one another and to the threaded spindle 36 that can be driven by the electric motor 12. On the piston-rod side of the hydraulic piston 30, and limited by the active surface 23 of the hydraulic piston 30, is an annular pressure chamber, which is the second pressure chamber 20 of the drive device. The annular pressure chamber located on the piston-rod side of the hydraulic piston 58, limited by the active surface 35 of the hydraulic piston 58, is the fifth pressure chamber 34, which according to FIG. 7 is permanently connected via a line 64 to the first pressure chamber 19.

The two hydraulic pistons 30 and 58 therefore do not completely correspond to the identically referenced hydraulic pistons from FIG. 6 because in the example of embodiment according to FIG. 7 the two completely cylindrical pressure chambers on the piston-rod sides of the two hydraulic pistons 30 and 58, which open to one another for fluid purposes, together form the fourth pressure chamber 32 of the cylinder-and-piston unit 13, in other words are only partial chambers 32' and 32" of the fourth pressure chamber. This again, as with the examples of embodiment described above, is connected via a line 39 to the third pressure chamber 25 of the cylinder-and-piston unit 10. The two piston surfaces 33' and 33" bordering on the two partial chambers together form the fourth active surface 33 of the cylinder-and-piston unit 13. The cross sections of the cylinder chambers in the cylinder-and-piston units 10 and 13 and the cross sections of the piston rods 21, 62 and 63 are selected so that, as in the second example of embodiment, the dimensional relationship of the sum of the fifth active surface 35 and the second active surface 23 to the first active surface 22 is equal to the dimensional relationship between the fourth active surface 33 and the third active surface 24.

In the example of embodiment according to FIG. 7, the two valves 40 and 45 of the examples of embodiment described above are combined to form a single directional valve 65 having two switching positions and four connections. One connection is connected to the low-pressure tank 41, one connection to the pressure chamber 20, one connection to the pressure chamber 25 and a final connection to the pressure chamber 19. In a spring-induced position of rest, which is illustrated in FIG. 7, the valve 65, via two of its connections, connects the two pressure chambers 19 and 20 to one another, while the other two connections are shut off. In its other switching position, the connection connected to the pressure chamber 19 is shut off, while, via the other three connections, the pressure chambers 20, 25 and 32 are connected to the low-pressure tank.

In the example of embodiment according to FIG. 7, there is no valve corresponding to the valve 46 of the examples of embodiment described above.

When the mold is closed, the valve 65 adopts the switching position shown in FIG. 7. The electric motor 12 is operated, during the closure of the mold, in a direction of rotation such that the threaded spindle 36, the piston rods 62 and 63 and the hydraulic pistons 30 and 58 move toward the right as seen in FIG. 7. As a result, pressure medium is forced from the pressure chambers 20 and 34 of the second cylinder-and-piston unit 13 into the pressure chamber 19 of the cylinder-and-piston unit 10. The hydraulic piston 17 moves toward the right and carries with it the mold platen 11 via the piston rod 21. The pressure medium forced out of the pressure chamber 25 is entirely received by the pressure chamber 32.

Shortly before the mold has closed, the hydraulic pistons 30 and 58 come to a halt. Because of inertia, the hydraulic piston 17 moves onward, so that the pressure in the pressure chambers 25 and 32 rises sharply and the hydraulic piston 17 is braked.

When the mold is closed, the valve 65 is switched over. The pressure chambers 20, 25 and 32 are then connected to the low-pressure tank 41, so that a pressure equal or close to atmospheric pressure prevails therein. During the further movement of the hydraulic pistons 30 and 58 toward the right, while the hydraulic piston 17 and the mold platen 11 move only slightly, if at all, a high locking pressure now builds up in the pressure chambers 34 and 19. This pressure generates, on the one hand, only a slight force at the relatively small active surface 35 of the hydraulic piston 58, which force must be absorbed by the rotation/translation converter 38, and on the other hand a high mold locking force at the active surface 22 of the hydraulic piston 17, which active surface 22 is larger than the active surface 35. The increase in size of the pressure chamber 32 is compensated by the inflow of pressure medium from the pressure chamber 20 and from the low-pressure tank 41.

When the injection operation has ended, the high pressure in the pressure chambers 19 and 34 is initially reduced to the pressure or close to the pressure in the low-pressure tank 41, the hydraulic pistons 30 and 58 being moved toward the left by operating the electric motor 12 in the corresponding direction of rotation. When this occurs, pressure medium is forced out of the pressure chamber 32 via the valve 40 into the low-pressure tank 41.

After the pressure reduction, the valve 65 is brought back into the switching position shown in FIG. 7. The hydraulic pistons 30 and 58 are moved further toward the left. The hydraulic piston 17, the piston rod 21 and the mold platen 11 follow this movement, because pressure medium is forced out of the pressure chamber 32 of the cylinder-and-piston unit 13 into the pressure chamber 25 of the cylinder-and-piston unit 10. The pressure medium which is forced out of the pressure chamber 19 of the cylinder-and-piston unit 10 flows into the enlarging pressure chambers 20 and 34 of the cylinder-and-piston unit 13.

Instead of a single differential cylinder 60, as a development of the example of embodiment according to FIG. 7, two or more differential cylinders 60 may be provided, being disposed as a plurality symmetrically to the axis of the threaded spindle, their axis then coinciding with the axis of the differential cylinder 59.

Figure 8:
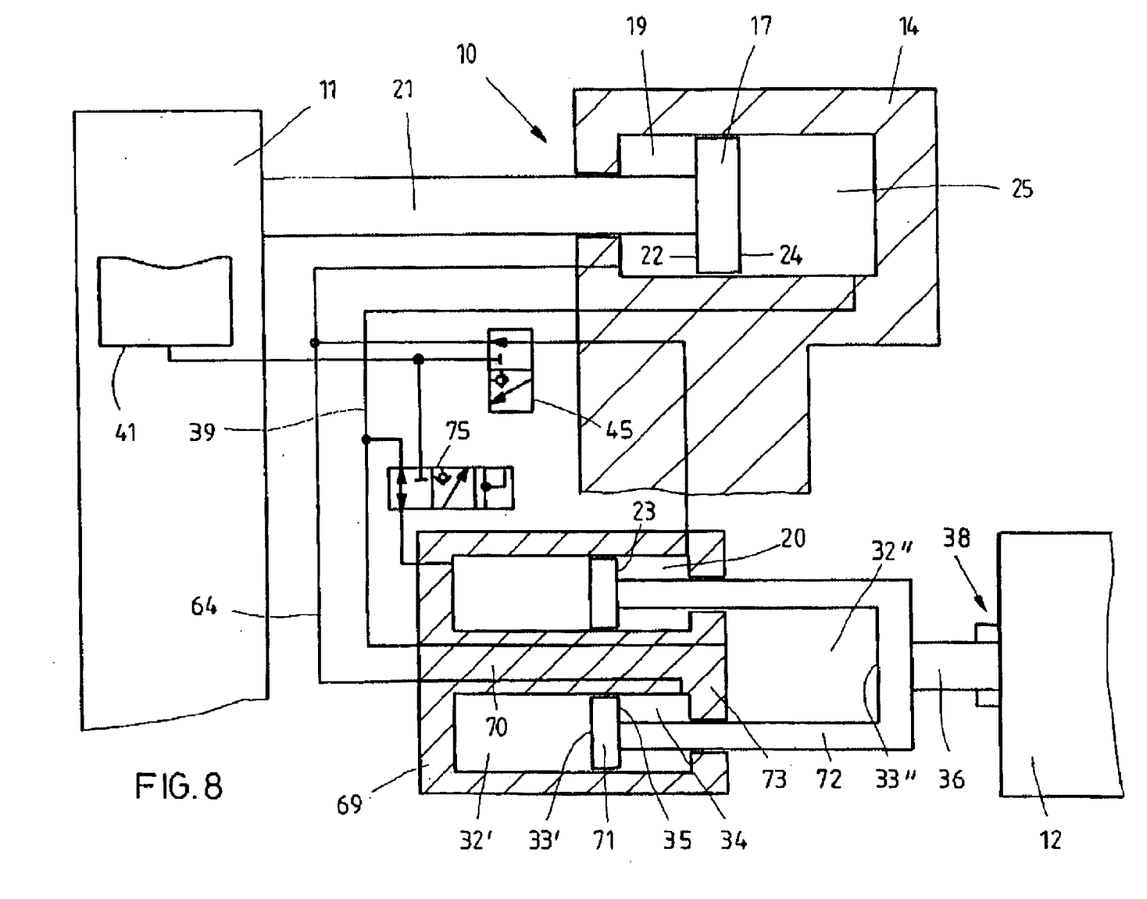
FIG. 8 shows the fourth example of embodiment in a position occurring during the closure of the mold.

The example of embodiment shown in FIG. 8 has the same first cylinder-and-piston unit 10 as the example of embodiment according to FIG. 7. The receiving cylinder-and-piston unit 10 is a differential cylinder having a cylinder 14 which is fixedly connected to the frame of a machine and having a hydraulic piston 17 formed as a differential piston, which is connected via a piston rod 21 to the movable mold platen 11. On the piston-rod side of the hydraulic piston 17 is the annular first pressure chamber 19 and on the non-piston-rod side is the third pressure chamber 24, which is completely cylindrical and thus larger than the first pressure chamber by the cross section of the piston rod 21. The hydraulic piston 17 borders on the first pressure chamber 19 with the first active surface 22 and on the third pressure chamber 25 with the third active surface 24.

The second, delivering cylinder-and-piston unit 13 has a cylinder 69 in the axis of which is a cylinder rod 70, so that the cylinder chamber is annular. An annular piston 71 is displaceable within the cylinder space, a busing-like piston rod 72 projecting away from one end of the annular piston 71, passing through an annular aperture in one end face of the cylinder 69 to the outside, and being mechanically connected to the threaded spindle 36. The internal diameter of the piston rod is greater than the diameter of the cylinder rod 70, so that a hydraulic piston 73 at one end of the cylinder rod divides the interior of the piston rod 72 into two chambers. The chamber defined axially between the part of the annular piston 71 projecting inward beyond the piston rod 72 and the hydraulic piston 73, and radially between the piston rod 72 and the cylinder rod 70, corresponds to the respective pressure chamber 34 of the examples of embodiment described above, and is thus the fifth pressure chamber 34 of the drive device according to FIG. 8 and is permanently connected via the line 64 to the pressure chamber 19. The part of the annular piston 71 projecting inward beyond the piston rod 72 accordingly comprises the fifth active surface 35. The other chamber within the piston rod 72 is a partial chamber of the fourth pressure chamber 32, specifically the partial chamber corresponding to the partial chamber 32" from FIG. 7. This partial chamber 32" is permanently connected via a line 39 to the pressure chamber 25 of the first cylinder-and-piston unit 10. The corresponding active surface inside on the piston rod 72 is designated 33".

The chamber defined axially between one end surface of the cylinder 69 and the part of the annular piston 71 projecting outward beyond the piston rod 72, and radially between the piston rod 72 and the cylinder 69, corresponds to the respective pressure chamber 20 of the examples of embodiment described above, and is thus the second pressure chamber 20 of the drive device according to FIG. 8. The part of the annular piston 71 projecting outward beyond the piston rod 72 accordingly comprises the second active surface 23.

The chamber defined axially between the other end surface of the cylinder 69 and the annular piston 71 corresponds to the partial chamber 32' of the example of embodiment according to FIG. 7, thus belonging to the fourth pressure chamber 32. The border active surface of the annular piston 71 is the active surface 33'. The cross sections of the pressure chambers are again selected so that, as in the second and third examples of embodiment, the dimensional relationship of the sum of the fifth active surface 35 and the second active surface 23 to the first active surface 22 is equal to the dimensional relationship between the fourth active surface 33 and the third active surface 24.

In the example of embodiment according to FIG. 8, a valve 45 with three connections and two switching positions is provided, this corresponding to the valve 45 of the examples of embodiment shown in FIGS. 1 to 6, in other words connecting the pressure chamber 20 in one switching position, which is shown in FIG. 8, to the pressure chamber 19 and in the other switching position to the low-pressure tank 41.

A further valve 75 is provided, having three connections and three switching positions, and performing inter alia the function of the valve 40 of the example of embodiment according to FIGS. 1 to 6, connecting, in one lateral switching position, the two partial chambers 32' and 32" of the pressure chamber 32 to the low-pressure tank 41. In the central position it connects only the partial chamber 32' with the low-pressure tank 41. In the other lateral switching position, the position shown, the valve 75 connects the partial chamber 32' to the line 39 and hence the whole pressure chamber 32 to the pressure chamber 25.

When the mold is closed, the valves 45 and 75 adopt the switching positions shown in FIG. 8. The electric motor 12 is operated, during the closure of the mold, in a direction of rotation such that the threaded spindle 36, the piston rod 72 and the hydraulic piston 71 move toward the right as seen in FIG. 8. As a result, pressure medium is forced from the pressure chambers 20 and 34 of the second cylinder-and-piston unit 13 into the pressure chamber 19 of the cylinder-and-piston unit 10. The hydraulic piston 17 moves toward the right and carries with it the mold platen 11 via the piston rod 21. The pressure medium forced out of the pressure chamber 25 is entirely received by the pressure chamber 32.

When the mold is closed, the valve 45 is switched over and the valve 76 is brought into the other lateral switching position. The pressure chambers 20, 25 and 32 are then connected to the low-pressure tank 41, so that a pressure equal or close to atmospheric pressure prevails therein. During the further movement of the hydraulic piston 71 toward the right, while the hydraulic piston 17 and the mold platen 11 move only slightly, if at all, a high locking pressure now builds up in the pressure chambers 34 and 19. This pressure generates, on the one hand, only a slight force at the relatively small active surface 35 of the hydraulic piston 71, which force must be absorbed by the rotation/translation converter 38, and on the other hand a high mold locking force at the active surface 22 of the hydraulic piston 17, which active surface 22 is larger than the active surface 35.

The increase in size of the pressure chamber 32 is compensated by the inflow of pressure medium from the pressure chamber 20 and from the low-pressure tank 41 and into the pressure chamber 20.

When the injection operation has ended, the high pressure in the pressure chambers 19 and 34 is initially reduced to the pressure or close to the pressure in the low-pressure tank 41, the hydraulic piston 71 being moved toward the left by operating the electric motor 12 in the corresponding direction of rotation. When this occurs, pressure medium is forced out of the pressure chamber 32 via the valve 75 into the low-pressure tank 41.

In a special working step for tearing open the mold, the valve 75 is brought into its central position, in which the pressure chamber 32' is connected to the low-pressure tank. When the hydraulic piston 17 is now moved toward the left, a pressure builds up in the chambers 32" and 25 which generates a force at the hydraulic piston 17 to tear open the mold. Because of the relatively small active surface 33", at which the pressure generates a force on the piston rod 72, the rotation/translation converter is not overloaded at this point. Pressure medium forced out of the chamber 32' passes via the valve 75 into the low-pressure tank 41 and via the two valves 45 and 75 into the pressure chamber 20.

After the mold is torn open, the two valves 45 and 75 are again brought into the switching positions shown in FIG. 8. The hydraulic piston 71 is moved further toward the left. The hydraulic piston 17, the piston rod 21 and the mold platen 11 follow this movement, because pressure medium is forced out of the pressure chamber 32 of the cylinder-and-piston unit 13 into the pressure chamber 25 of the cylinder-and-piston unit 10. The pressure medium which is forced out of the pressure chamber 19 of the cylinder-and-piston unit 10 flows into the enlarging pressure chambers 20 and 34 of the cylinder-and-piston unit 13.

I claim:

1. A drive device for driving a first movable part (11) in an advance stroke, a power stroke and a return stroke, the drive device being suitable for operating a mold closure device for an injection molding machine, the drive device comprising the following:

a first, receiving hydraulic cylinder-and-piston unit (10) having a first pressure chamber (19), which can be subjected to the action of pressure in a power stroke alone, and having a third pressure chamber (25) to be subjected to the action of pressure on the return stroke;

a second, delivering cylinder-and-piston unit (13) having a fourth pressure chamber (32) which is connected to the third pressure chamber (25) at least on the advance stroke and on the return stroke, and having a fifth pressure chamber (34) which is connected to the first pressure chamber (19) on the advance stroke and on the power stroke;

a drive motor (12) by which the piston (30, 30, 58) and cylinder (29) of the second cylinder-and-piston unit (13) are movable relative to one another;

a second pressure chamber (20) in one of the two cylinder-and-piston units (10, 13);

a valve arrangement (45) via which, during the advance stroke, pressure medium can be forced from the second pressure chamber (20) into the first pressure chamber (19) and, during the power stroke, the second pressure chamber (20) can be relieved of pressure separately from the first pressure chamber (19);

a cross section of the third pressure chamber (25) and of the fourth pressure chamber (32) are dimensioned relative to each other such that pressure medium forced out of the third pressure chamber (25) during the advance stroke can be received by the fourth pressure chamber (32).

2. The drive device as claimed in claim 1, wherein the first hydraulic cylinder-and-piston unit comprises a first hydraulic piston (17), which borders with a first active surface (22) on the first pressure chamber (18) and with a third active surface (24), which faces in the opposite direction to the first active surface (22), on the third pressure chamber (25), and wherein the second hydraulic cylinder-and-piston unit (13) comprises a second hydraulic piston (30), movable relative to the cylinder (29) and bordering with a fourth active surface (33) on the fourth pressure chamber (32) and with a second active surface (23), which faces in the opposite direction to the fourth active surface (33), on the second pressure chamber (20), and comprises a further hydraulic piston (58), which is fixedly connected to the second hydraulic piston (30), and possesses a fifth active surface (35), which borders on the fifth pressure chamber (34) and is active in the same direction as the second active surface (23), and wherein the dimensional relationship of the sum of the fifth active surface (35) and the second active surface (23) to the first active surface 22 is equal to the dimensional relationship between the fourth active surface (33) and the third active surface (24).

3. The drive device as claimed in claim 1, wherein the first hydraulic cylinder-and-piston unit comprises a first hydraulic piston (17), which borders with a first active surface (22) on the first pressure chamber (19) and with a second active surface (23), which is smaller than the first active surface (22) and faces in the opposite direction thereto, on the second pressure chamber (20), and comprises a further hydraulic piston (18), which is fixedly connected to the first hydraulic piston (17), and possesses a third active surface (24), which borders on the third pressure chamber (25) and is active in the same direction as the second active surface (23), and wherein the second hydraulic cylinder-and-piston unit (13) comprises a second hydraulic piston (30), movable relative to the cylinder (29) and bordering with a fourth active surface (33) on the fourth pressure chamber (32) and with a fifth active surface (35), which faces in the opposite direction to the fourth active surface (33), on the fifth pressure chamber (34), and wherein the dimensional relationship between the fifth active surface (35) and the difference between the first active surface (22) and the second active surface (23) is equal to the dimensional relationship between the fourth active surface (33) and the third active surface (24).

4. The drive device as claimed in claim 1, wherein one of the first and the second cylinder-and-piston units has three pressure chambers and encompasses two cylinders (59, 60) having two hydraulic pistons (30, 58), which are fixedly connected to one another via their piston rods (62, 63), the third pressure chamber and the fourth pressure chamber (32) respectively being formed by two partial pressure chambers (32', 32"), one of which is located in one cylinder (59) and the other in the other cylinder (60).

5. The drive device as claimed in claim 1, wherein one of the first and the second cylinder-and-piston units has three pressure chambers and comprises an annular cylinder (69), an annular piston (71), a bushing-like piston rod (72) fixed to the annular piston (71) and having an internal diameter greater than the internal diameter of the annular piston (71) and a circular piston (73), located in the piston rod (72) and fixedly connected via a central cylinder rod (70), enclosed by the annular piston, to the annular cylinder (69), an annular space (20) for pressure medium being located radially outside the piston rod (72), axially between the annular piston (71) and the annular cylinder (69), an annular space (34) being located radially inside the piston rod (72) and axially between the annular piston (71) and the circular piston (73), and an annular space (32') being located between the side of the annular piston (71) remote from the piston rod (72) and the annular cylinder (69), and a space (32") being located between the circular piston (73) and the piston rod (72).

6. The drive device as claimed in claim 2, wherein the further hydraulic piston (18, 58) is formed by a plunger-like projection on the side of the first hydraulic piston (17) or second hydraulic piston (30) facing the second pressure chamber (20).

7. The drive device as claimed in claim 3, wherein the further hydraulic piston (18, 58) is formed by a plunger-like projection on the side of the first hydraulic piston (17) or second hydraulic piston (30) facing the second pressure chamber (20).

8. The drive device as claimed in claim 3, wherein the first hydraulic piston (17) comprises on one side a piston rod (21) traversing the first pressure chamber (19) and connected outside the cylinder (14) to the movable part (11) and wherein the further hydraulic piston (18) is formed by a plunger-like projection on the side of the first hydraulic piston (17) facing the second pressure chamber (20).

9. The drive device as claimed in claim 8, wherein the third active surface (24) is larger than the difference between the first active surface (22) and the second active surface (23).

10. The drive device as claimed in claim 1, wherein one pressure chamber of the third and the fourth pressure chambers comprises a first partial pressure chamber and a second partial pressure chamber, of which one partial pressure chamber can be connected jointly with the other partial pressure chamber via a valve (75) to the other of the third and the fourth pressure chambers and can be connected separately from the other partial pressure chamber to a low-pressure tank (41).

11. The drive device as claimed in claim 1, wherein the fourth pressure chamber (32) and the third pressure chamber (25) can be connected via a valve (40, 65) to a low-pressure tank (41).

12. The drive device as claimed in claim 11, wherein the low-pressure tank (41) is a closed tank with no connection to atmosphere and with a volume compensation system provided by a flexible wall (42) or a gas cushion.

13. The drive device as claimed in claim 2, wherein the fifth active surface (35) is smaller than the first active surface (22) on the first hydraulic piston (17).

14. The drive device as claimed in claim 3, wherein the fifth active surface (35) is smaller than the first active surface (22) on the first hydraulic piston (17).

15. The drive device as claimed in claim 1, wherein the fifth pressure chamber (34) is connected in a first position of a further valve (46) to the first pressure chamber (19) and in a second position of the further valve (46) to the low-pressure tank (41).

16. A method for operating a drive device as claimed in claim 1, comprising the steps of increasing the pressure in all five pressure chambers (19, 20, 25, 32, 34) above atmospheric pressure, and moving the movable part during the presence of elevated pressure in all five pressure chambers.

17. The method as claimed in claim 16, wherein, in the steps of increasing the pressures, the pressures are made sufficiently high that, when the second hydraulic piston (30)

is stationary and the movable part (11) is braked from full movement, the pressure in each of the five pressure chambers (19, 20, 25, 32, 34) remains higher than atmospheric pressure.

18. The method as claimed in claim 17, further comprising a step of displacing the second hydraulic piston (30) to build up prestress pressures in the first, second, third and fifth pressure chambers (19, 20, 25, 32) and to diminish pressure in the fourth chamber (32), a step of connecting the first pressure chamber (19) and the second pressure chamber (20) to one another, and a step of separating the third pressure chamber (25) and the fourth pressure chamber (32) from a low-pressure tank (41).

* * * * *